Figure 1:
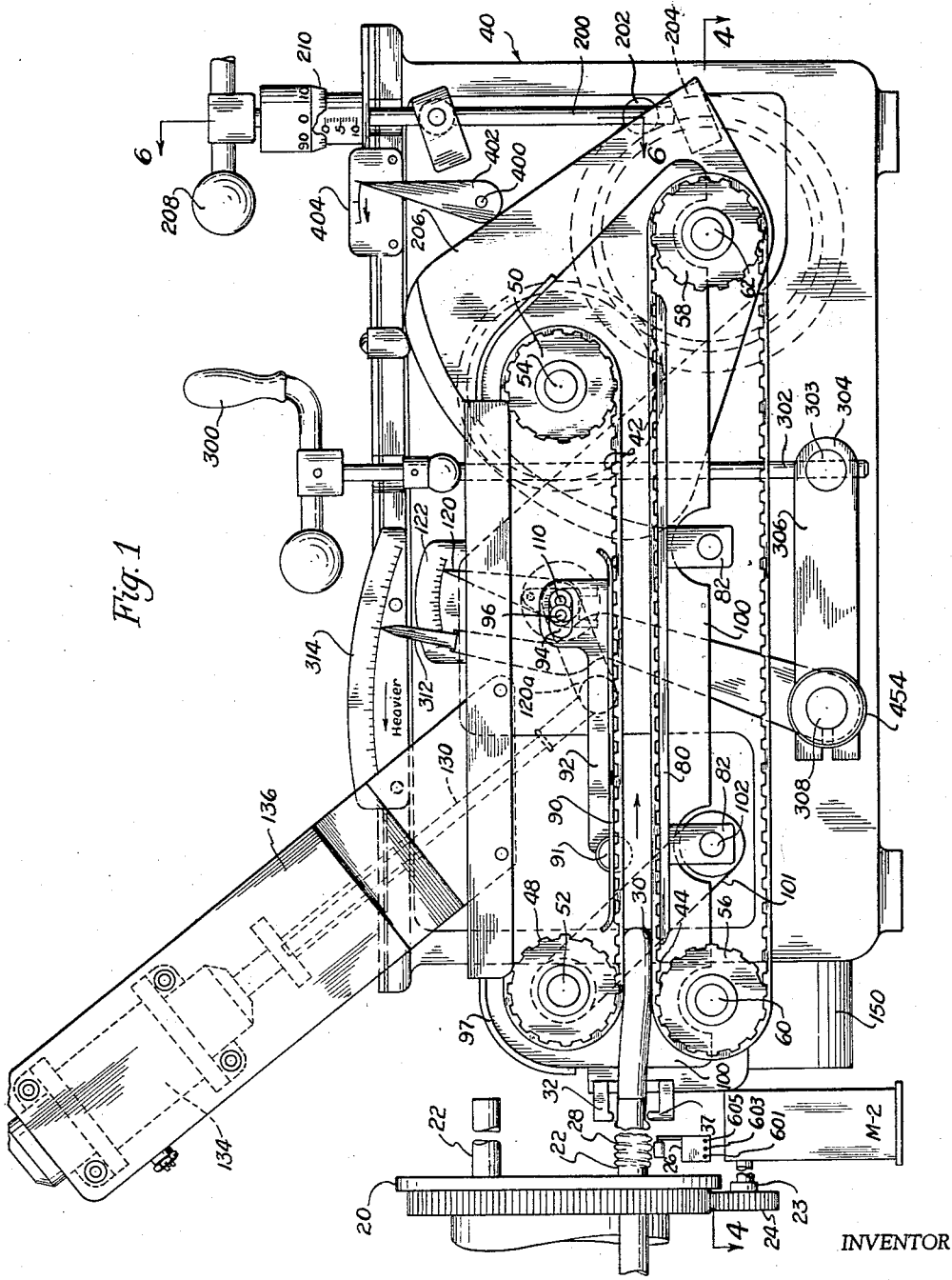

Sept. 15, 1964  P. F. GOOD  3,148,408
STUFFED SAUSAGE CASING SIZER
Filed May 24, 1962  7 Sheets-Sheet 1

INVENTOR
Paul F. Good

BY Bailey, Stephens & Huettig
ATTORNEYS

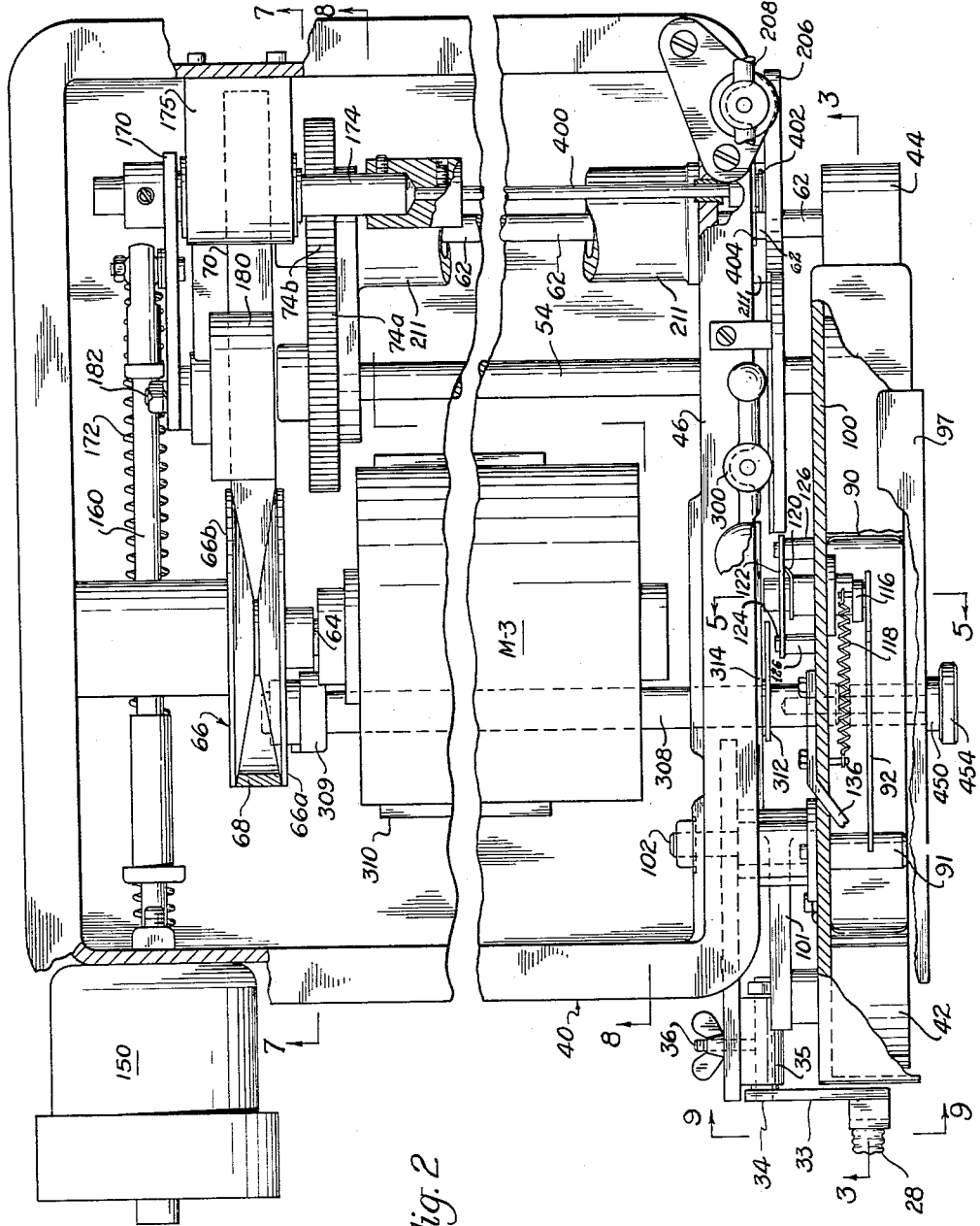

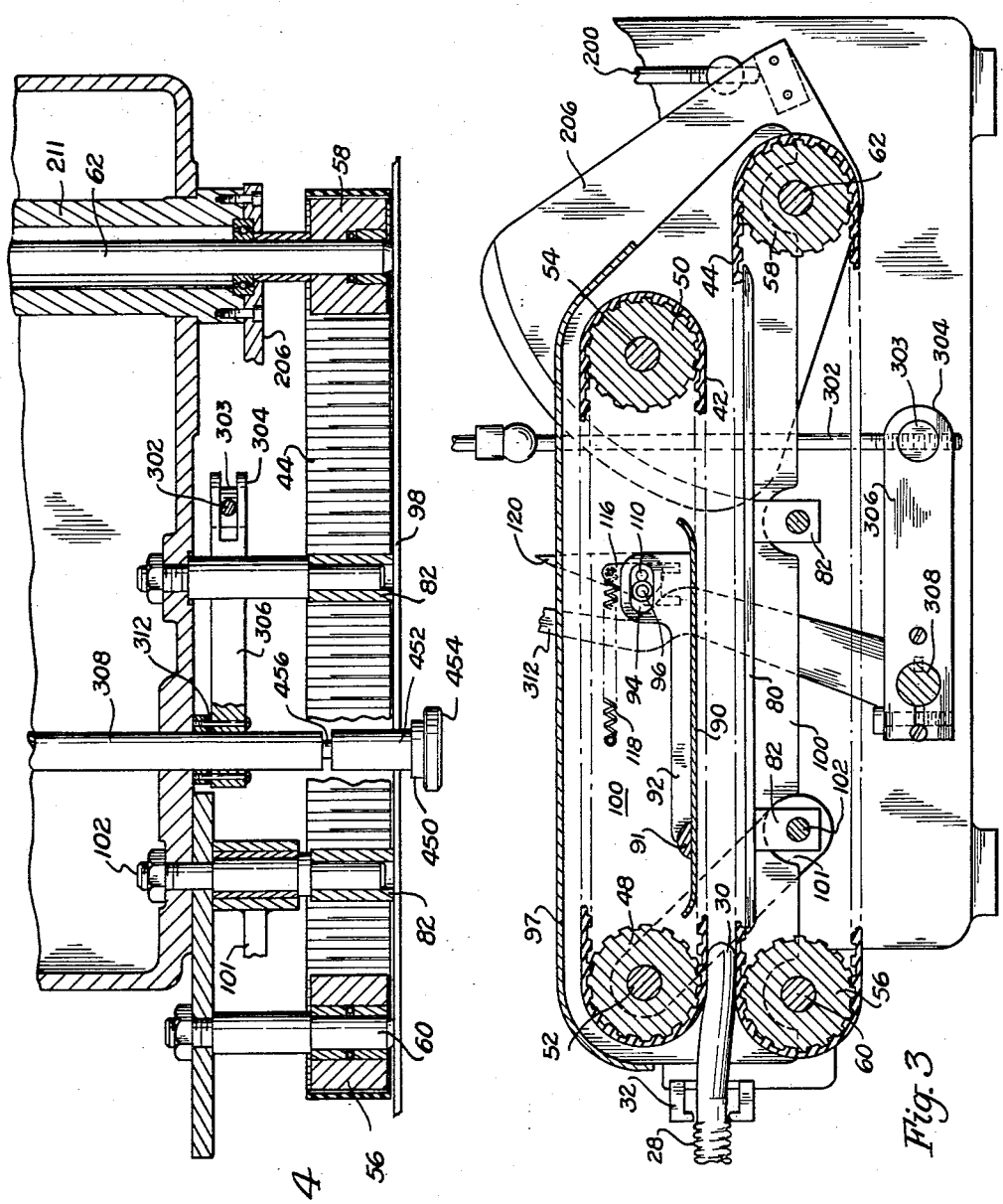

Sept. 15, 1964 P. F. GOOD 3,148,408
STUFFED SAUSAGE CASING SIZER
Filed May 24, 1962 7 Sheets-Sheet 5

INVENTOR
Paul F. Good
BY
Bailey, Stephens & Huettig
ATTORNEYS

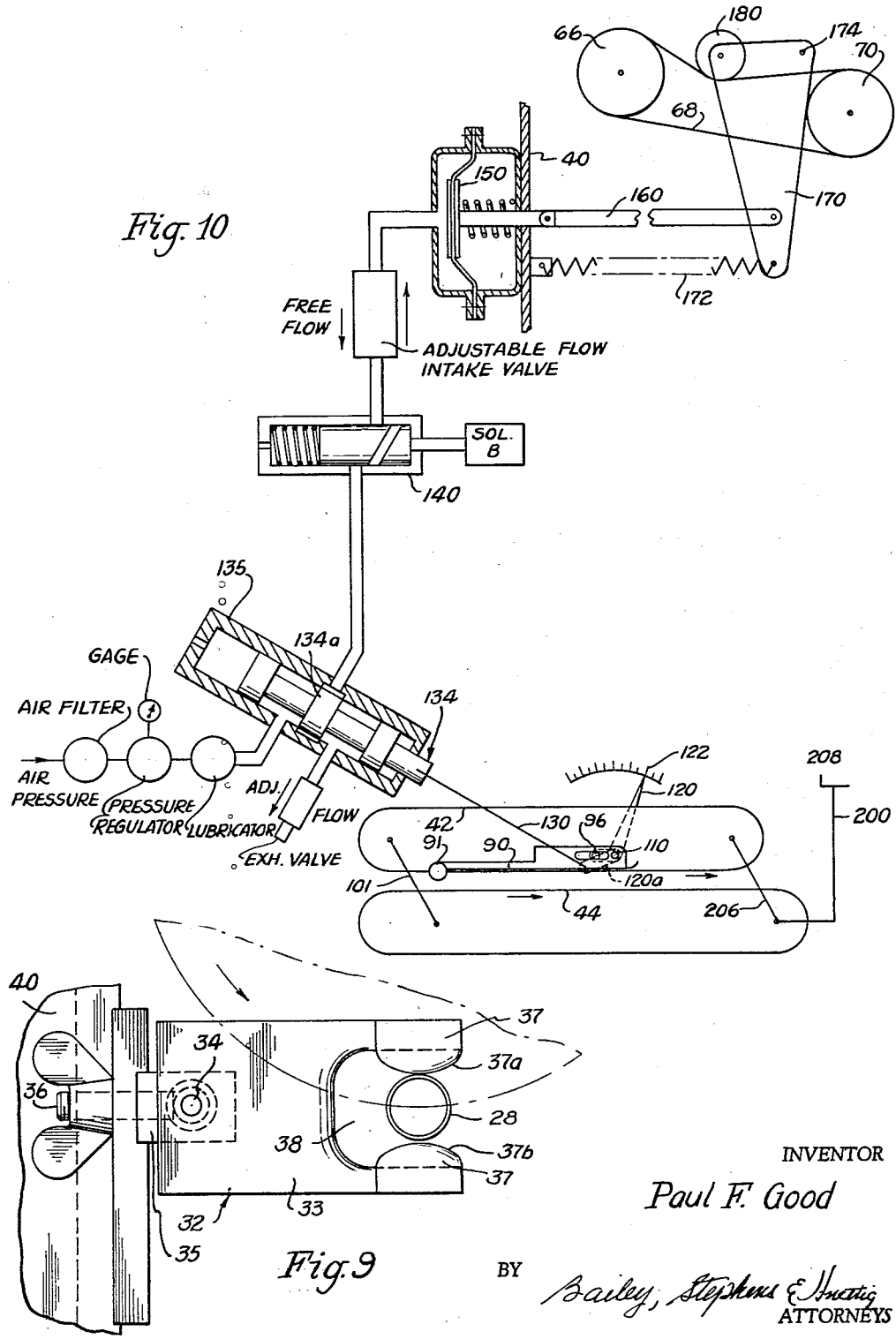

United States Patent Office 3,148,408
Patented Sept. 15, 1964

3,148,408
STUFFED SAUSAGE CASING SIZER
Paul F. Good, Lutherville, Md., assignor to Speedco, Inc., Baltimore, Md., a corporation of Maryland
Filed May 2, 1962, Ser. No. 197,379
9 Claims. (Cl. 17—35)

This invention relates to the stuffing of sausage and, in particular, is directed to the control of the size of the stuffed sausage casing.

In current use are sausage stuffing machines in which a sausage pump is used to pump the sausage dough through a stuffing horn. A casing of synthetic material and folded to be shirred or accordion pleated is placed over the stuffing horn and the free end is momentarily held closed as the flow of sausage dough starts to fill the casing. The extended casing may be anywhere from 54 to 87 feet long. Some means, such as pressure applied manually or by mechanical gripping fingers, is used to restrain the unfolding sausage casing as the filled portions leave the horn in an attempt to keep the sausage casing evenly filled throughout its length. Two variables can be assumed to control the quantity of sausage dough in each increment of the filled casing, namely the linear speed at which the casing moves as it is being filled and the diameter of the filled casing. As the restraint on the unfolding casing varies, some portions of the casing are packed more tightly with sausage dough. Also, differences in the diameter of the casing at one or more portions of the casing length mean that the stuffed sausage casing weighs more or less at such portions. Thus the difficulty exists in that eventually sausage links of uniform weight cannot be obtained, which means that an added expense is incurred in correcting the weights of packages of sausages.

The objects of this invention are to produce a sausage stuffing apparatus which stuffs substantially evenly throughout the length of the casing from which uniform sausage links are obtained, to produce an apparatus by means of which successive sausage casings are automatically filled after being placed on the stuffing horn, and to produce an apparatus which lessens the expense of manual labor in forming and packing sausages.

In general, the means by which these objects are obtained comprise a pair of parallel endless belts between which a stuffed sausage casing is received as it comes from the stuffing horn. These belts frictionally engage the stuffed sausage casing, and the speed of the belts controls the rate at which the sausage casing can leave the stuffing horn as it is being filled with sausage dough. At least one of the belts is displaceable by a change in the diameter of the filled casing. Sensing means are provided so that movement of this belt in response to a change in the diameter of the stuffed casing actuates a mechanism for changing the speed of the belts. When the diameter of the casing lessens, the belt speed is slowed so that more dough is filled into the casing per unit of casing length to swell the casing back to a pre-selected diameter. When the casing diameter exceeds a given value, then the belt speed is increased so that less sausage dough per unit of casing length enters the casing and the diameter of the casing decreases. The sizing apparatus is preferably used in conjunction with a multiple horn turret head for the sausage dough stuffer. Casing stripper means is used to strip the folds from the casing and to close the leading end of the casing, and to hold the unfilled casing portion on the horn. Electrical means are provided so that when the trailing end of a sausage casing leaves a section of a horn, and after a short time delay needed to stop the sausage dough flow through the horn, the turret head is indexed to bring a following horn loaded with an unfilled casing into pumping position. Thus the sizer runs continuously with little time lost between the filling of successive sausage casings.

Figure 5:
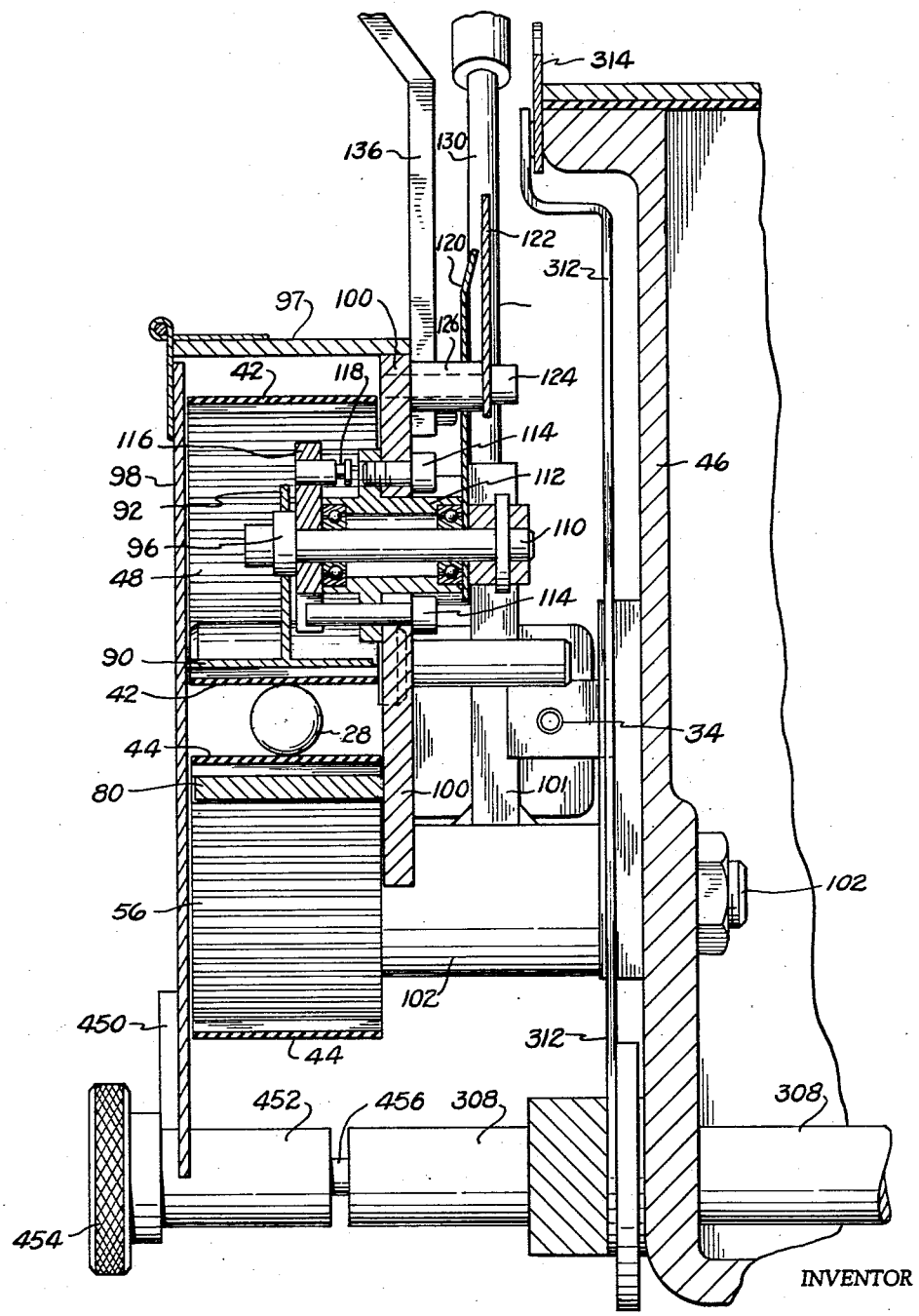
Figure 7:
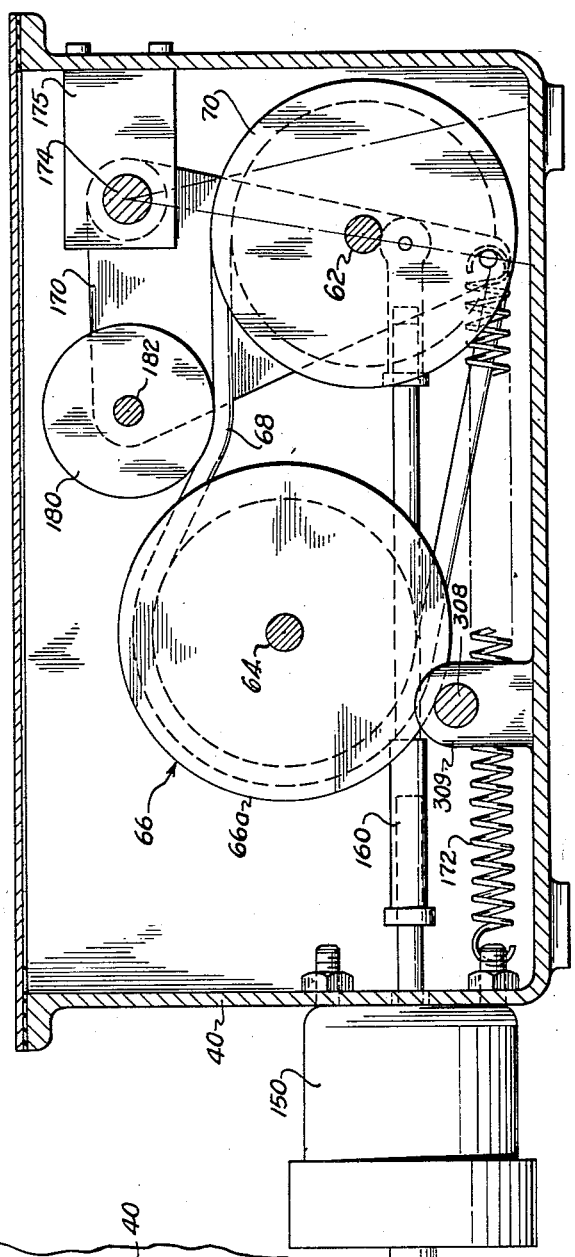
Figure 6:
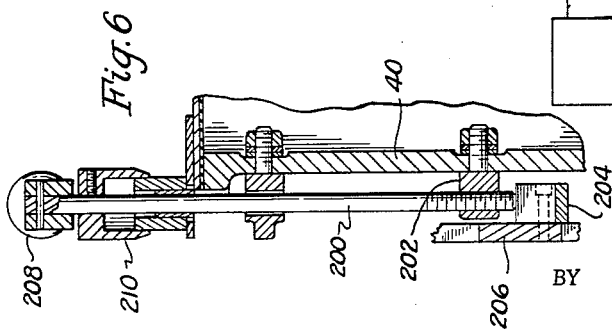
Figure 8:
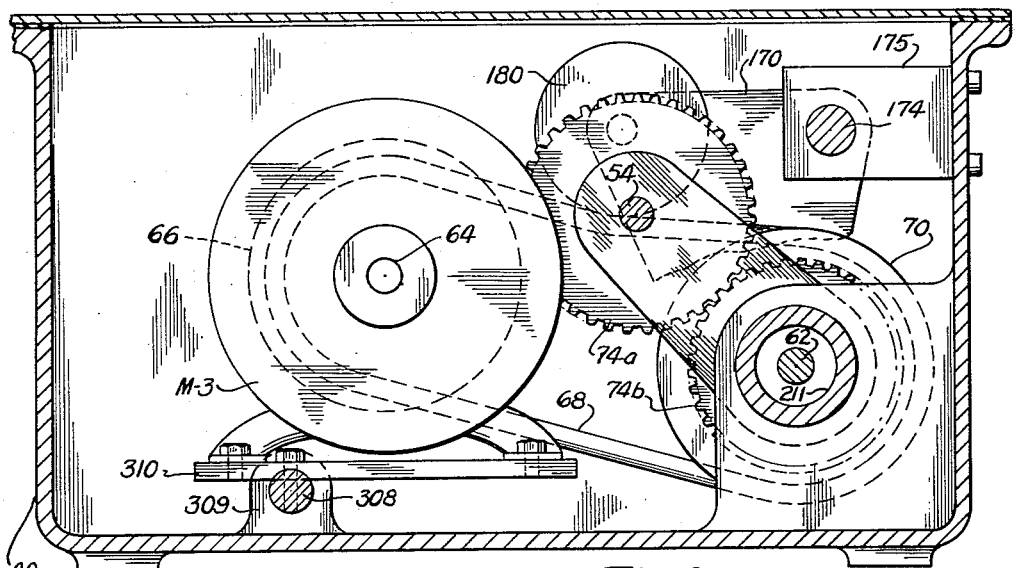
Figure 11:
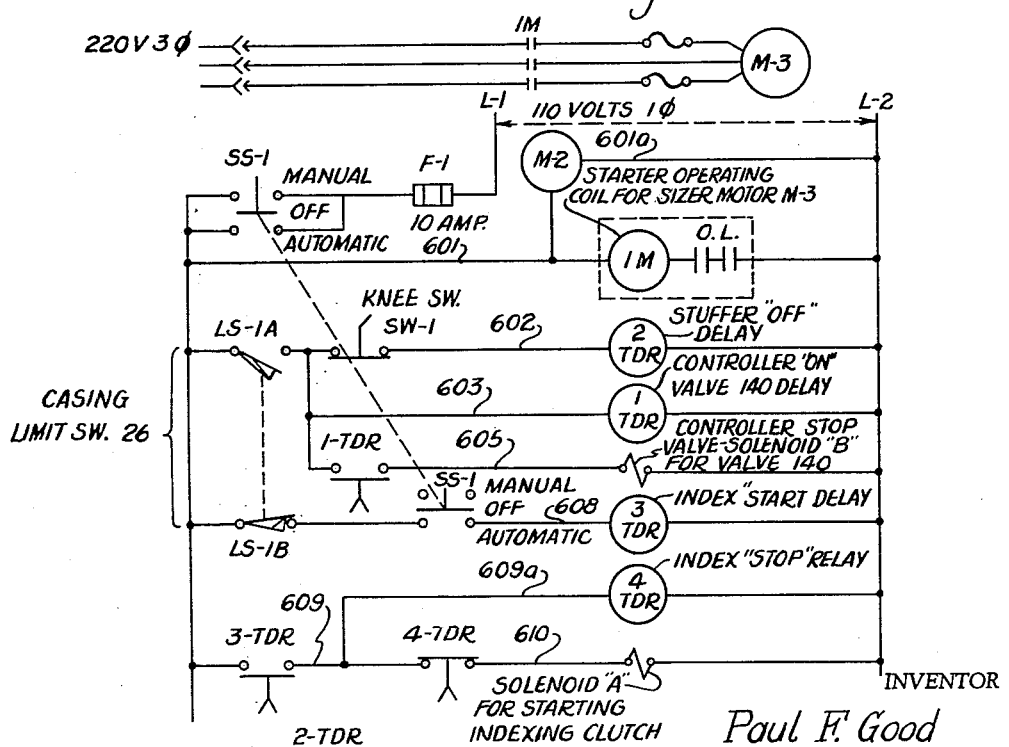

The means by which the objects of the invention are obtained are disclosed more fully with reference to the accompanying drawings, in which:

FIGURE 1 is a front elevational view of the stuffed sausage casing sizer of this invention;
FIGURE 2 is a broken top plan view of FIGURE 1, with top cover removed with some parts removed and other parts shown in section;
FIGURE 3 is a cross-section view taken on the line 3—3 of FIGURE 2;
FIGURE 4 is a partial cross-sectional view taken on the line 4—4 of FIGURE 1;
FIGURE 5 is an enlarged cross-sectional view taken on the line 5—5 of FIGURE 2;
FIGURE 6 is a partial cross-sectional view taken on the line 6—6 of FIGURE 1;
FIGURE 7 is a cross-sectional view taken on the line 7—7 of FIGURE 2;
FIGURE 8 is a cross-sectional view taken on the line 8—8 of FIGURE 2;
FIGURE 9 is an enlarged front view of the casing stripper as seen on the line 9—9 of FIGURE 2;
FIGURE 10 is a schematic view showing the means for sensing the diameter of the stuffed casing and controlling the speed of the conveyor belts; and
FIGURE 11 is a schematic view of the electrical circuit for operating the apparatus.

This invention is described with reference to a conventional type sausage stuffer, either an air or motor actuated type, having a sausage dough pumping delivery valve or clutch actuated by a switch, note FIGURE 11, and a turret head 20, FIGURE 1. This turret head is provided with a plurality of stuffing horns 22, each of which is adapted to be turned into stuffing position. A prefolded accordion pleated or shirred synthetic casing 28 is slid over the free discharge end of the stuffing horn, the horn rotated into position, and then the casing is filled with sausage dough, and while being filled is unfolded and moves longitudinally away from the free end of the stuffing horn. According to this invention, a turret head indexing motor M–2 is connected by a single revolution clutch 23 and by a gear train 24 to the turret head for indexing the same. A limit switch 26 has a roller arm spring-pressed so as to be engageable with a metal stuffing horn 22. However, when a casing is placed on a stuffing horn and the horn then brought into pumping position, the casing actuates the limit switch. Then when the shirred portion of the casing is pulled free of the switch roller, the limit switch is further actuated whereby the motor M–2 after a short time delay is energized so as to index a new casing to stuffing position. At the same time, during this interval, the dough flow from the stuffer is temporarily stopped.

According to this invention, it is not necessary to tie or manually hold closed the free leading edge 30 of the casing 28. Instead about 4 to 6 inches are unfolded by being manually pulled off of the stuffing horn before indexing, and this empty casing end extends freely from the end of the horn before sausage dough stuffing begins.

A casing stripper 32 folds back this empty casing end during indexing and before the stuffing begins, and effectively closes the end of the casing during stuffing. A plate 33 is joined to a shaft 34 which is journalled in a housing 35 fastened to the machine frame by stud and wing nut 36. On the free end of plate 33 are a pair of lugs 37 having curved facing edges 37a and 37b spaced a distance slightly greater than the diameter of the stuffing horn, and spaced from plate 33. A rectangular opening 38 is formed in plate 33 behind lugs 37. When a stuffing horn swings into stuffing position, the empty casing end strikes the top edge of plate 33 and bends across the end of the horn before the end of the horn comes to rest between the curved edges of lugs 37. Any misalignment is corrected as the lugs are moved by the horn by rocking shaft 34. When stuffing starts, at about ten feet per second, the sausage dough strikes the inside of the folded end and pushes the folded casing end through opening 38. This is sufficient to seal the free end 30 of the casing against the escape of sausage dough while simplifying and quickening the time for stuffing the casing. At the same time, the curved edges 37a and 37b provide a pressure against the leading shirred fold of the casing 28 while the casing unfolds as it is filled, and the folded casing portion is held on the stuffing horn.

The sizer apparatus further includes, in general, a metal box 40 containing the electric motor M–3 and the driving mechanism for a pair of endless belts. These endless belts are composed of an upper belt 42 and a lower belt 44 parallel and spaced from each other to receive the stuffed sausage casing therebetween. These endless belts are positioned on the outside of the wall 46 of box 40. Upper belt 42 runs around a pair of sprockets 48 and 50 rotatably mounted upon a stub shaft 52 and a drive shaft 54, respectively. Likewise, lower belt 44 runs around sprocket 56 rotatably mounted on a stub shaft 60 mounted on wall 46 and a sprocket 58 joined to drive shaft 62. Shaft 64 of motor M–3 drives a variable speed pulley 66 having movable spring-pressed flanges 66a and 66b. Pulley belt 68 extends between pulley 66 and sheave 70 splined to shaft 62. Shaft 62 runs to and is fixed to sprocket 58. A gear train composed of gears 74a and 74b connects shafts 62 and 54 to drive upper belt 42 at the same speed as lower belt 44. The upper reach of lower belt 44, note FIGURES 1 and 3, is supported by a plate 80 secured to wall 46 by brackets 82. Consequently, the upper reach of belt 44 is not vertically displaceable. On the top surface of the lower reach of upper belt 42 rides the flat metal shoe 90 of a casing diameter sensing mechanism. Shoe 90 is pivoted on a shaft 91. A vertical flange 92 joined to shoe 90 has a slot 94 so as to be movably hung on a roller 96.

Belts 42 and 44 and their associated assemblies are contained in a housing 97 having a hinged front cover 98. A plate 100 forms the back wall of housing 97 and carries stub shaft 52 for sprocket 48. A link 101 extends from shaft 52 to bolt 102, which also secures the left side bracket 82, FIGURE 1, to wall 46. Drive shaft 54 for upper sprocket 50 is journalled in plate 100. A link 206, hereinafter more particularly described, extends between shafts 54 and 62 so that belts 42 and 44 are joined in a parallelogram, FIGURE 10, with the upper belt 42 being vertically displaceable with respect to lower belt 44.

A shaft 110 is rotatably mounted in a bushing 112 extending through and secured to wall 100 by bolts 114. Lever 116 is fixed to the end of shaft 110 adjacent flange 92. Roller 96 is joined by a stub shaft to the free end of lever 116 and extends through slot 94 so as to establish a leverage between shaft 110 and roller 96. As the centers of roller 96 and shaft 110 are slightly offset from each other, any change in the vertical position of belt 42 will displace shoe 90 and rock shaft 110. Shoe 90 is urged into contact with belt 42 by a spring 118 having one end attached to lever 116 and the other end secured to wall 100. Between walls 100 and 46 is a pointer 120 attached to shaft 110. A corresponding scale plate 122 is mounted on wall 100 by means of bolts 124 and spacers 126.

The following means are provided to give the sizer an automatic operation. Pointer 120 has a lower arm 120a extending beneath shaft 110 to which is attached a valve stem 130, a change in the diameter of the stuffed casing 28 as it runs between belts 42 and 44 is sensed by the shoe 90, indicated by pointer 120, and with the resulting movement of rod or valve stem 130. As shown in FIGURE 10, this rod actuates piston valve spool 134 and land 134a in a pneumatic valve 135, seen in FIGURE 1 as supported on housing 97 by bracket 136, so that air is either fed or discharged through valve 140 to actuate a diaphragm 150. A rod 160 joined to the diaphragm 150 extends to a crank plate 170, FIGURE 7, pivotally held by a shaft 174 journalled in a block 175 fastened to box 40. Roller 180 is joined to plate 170 by the shaft 182 and bears upon belt 68. The lowermost end of plate 170 is attached to a spring 172 which spring has its other end secured to the wall of box 40. A movement of belt shoe 90 thus causes a displacement of diaphragm 150 and results in a change in the pressure at which roller 180 bears on belt 68. If the diameter of stuffed casing 28 decreases below a pre-selected diameter, roller 180 will bear more heavily on belt 68, thus shortening the effective length of the belt by forcing the belt more deeply between pulley flanges 66a and 66b. This causes a decrease in the belt speed and, consequently, an increase in the volume of filling of sausage dough per unit length of casing within the casing because more dough accumulates per increment of casing length just before the casing starts to enter between belts 42 and 44. When the casing 28 increases in diameter beyond an acceptable size, the roller 180 will be lifted, thus permitting belt 68 to move radially outwardly between flanges 66a and 66b to increase the speed of belts 42 and 44. Therefore, less dough is filled into the casing at the entrance to the belts so that the casing diameter decreases. At the same time, the variation from a given diameter can be visually observed on scale 122 in order to determine whenever the apparatus is functioning satisfactorily.

The distance between belts 42 and 44 is changeable to accommodate a stuffed sausage casing of a predetermined diameter. A rod 200, FIGURES 1 and 6, has its lower end portion threaded to a nut 202 fastened to a wall of box 40 with the lower end of the rod bearing against an abutment 204 attached to the plate 206. The upper end of the rod 200 is turned by a handle 208 and is provided with a micrometer scale 210. Plate 206, FIGURE 4, is fixed to hollow trunnion housing 211 rotatably mounted in box 40 and housing 211 contains shaft 62. Plate 206 supports shaft 54 to form a link between the shafts 54 and 62. When rod 200 is turned downwardly, the parallelogram including the links 101 and 206, note FIGURE 10, will be opened to increase the distance between belts 42 and 44, and vice versa. Lower belt 44 remains stationary, while plate 100 upon which upper belt 42 and housing 97 are mounted is either raised or lowered. At the same time, the gear 74a rolls on gear 74b so that their effective engagement s unchanged.

The initial spread for the belts 42 and 44 is set by turning handle 300 joined to a shaft 302, with the lower end of the shaft threaded through a nut 303, note FIGURE 4, pivotally mounted in the bifurcated free end 304 of beam 306, which has its other end fixed to one end of shaft 308.

The other end of shaft 308 is journalled in a block 309 seated on the floor of box 40. A plate 310 is fastened off-center to shaft 308 and carries motor M–3 centered on the plate. When handle 300 is turned, shaft 308 is rocked and motor shaft 64 swings about shaft 308. Such a displacement will force pulley belt 68 either inwardly or outwardly between pulley flanges 66a and 66b and thus set the initial belt speed. A pointer 312 has its lower end joined to shaft 308 and extends upwardly between wall 46 and plate 100 to a scale 314 attached to the top edge of wall 46 so that the belt speed setting can be visually observed.

An indicator is also provided to show whether or not the belt speed automatic regulating mechanism is operating within its working range. Shaft 400 is an extension of shaft 174, which pivots with plate 170, and passes outwardly through the front wall 46 of box 40. The end of this shaft is provided with a pointer 402, while a corresponding scale plate 404 is fastened to the top of wall 46. If the stuffer is furnishing sausage dough at a too low a rate, the sausage casing will be undersized and the belt speed automatic regulating mechanism will try to slow the belts to obtain the proper casing diameter. However, the output of the sausage dough stuffer may be outside of the range of the belt control mechanism, and if the sausage dough stuffer output is too low, it will be beyond the range of the control mechanism and the indicator pointer 402 will move to the extreme left in FIGURE 1 to show that the control mechanism is at its extreme slow position. When this is seen, the operator decreases the sizer belt speed by means of crank handle 300 so that the pointer 402 will move toward its center position.

Hinged cover 98 is held closed by a tongue 450 attached to a stem 452 turnable by a knob 454. The lower edge of cover 98 is notched so that it can swing over knob 454. Stem 452 is rotatably mounted on an extension 456 of shaft 308. Cover 98 assists in holding belts 42 and 44, while they are running, on their respective sprockets, and also holds the sprockets on their respective shafts. Thus, when the sizer is stopped, the cover is opened, the belts and sprockets quickly removed, cleaned, and then returned to their places in the sizer.

The apparatus can be used without the automatic pneumatic belt speed control comprising the system through rod 130 to roller 180. In such case, the operator simply watches pointer 120 from time to time and occasionally turns handle 300 to increase or decrease the belt speed as may be needed to center pointer 120 on scale 122 if the flow from the dough stuffer changes during the stuffing of any particular batch of casings.

When the automatic control is used, an increase in the diameter and the weight of the stuffed casing travelling between belts 42 and 44 moves pointer 120 to the right, FIGURE 10, and at the same time pushes rod 130 to the left. On the other hand, assuming the stuffed casing decreases in diameter, the pointer 120 will move to the left of the center of scale 122. Rod 130 moves to the right causing land 134a to move and open the passage to valve 140 to admit air to diaphragm 150. Rod 160 is moved to the right and pivots plate 170, thus causing roller 180 to bear down on pulley belt 68. As belt 68 is forced deeper between flanges 66a and 66b, the drive is slowed. Belts 42 and 44 then run slower so that more sausage dough is received in each unit length of casing. Valve 140 is opened during stuffing, and closes before the trailing end portion of the casing enters between belts 42 and 44. The purpose of valve 140 is to lock diaphragm 150 in its last operating position for a fully filled casing. Otherwise, the control mechanism would start to shift when the trailing end of a stuffed casing leaves the belts 42 and 44, and before a new casing is received between the belts. Time would be required for the control mechanism to adjust itself back to its normal position.

The inflow of air to diaphragm 150 is metered by the adjustable flow intake valve located between valve 140 and diaphragm 150. The air discharge is controlled by the adjustable flow exhaust valve located beneath valve 135. These flow valves are adjusted to control the response times of the in and out air movements to diaphragm 150.

The advantage of using the limit switch 26 to index the turret head is that, regardless of the length of the casing, it will be stuffed to its end and, in practice, casings vary in length. With timers heretofore used, the sausage pump is always stopped after a given length of time so that some casings are incompletely filled. In this invention, each casing is always filled from approximately beginning to end regardless of the changes in the speeds of the belts 42 and 44 taking place during the stuffing and regardless of the length of the casing.

The general automatic electrical operation of the stuffed sausage casing sizer is described with reference to the schematic electrical circuit shown in FIGURE 11. Power is supplied to lines L-1 and L-2. Line L-1 contains fuse F-1 and selector switch SS-1. When this switch is placed on automatic, coil 1M is energized through line 601 to close corresponding contacts to energize motor M-3, and motor M-2 is energized through line 601a. Both motors run continuously. A stuffing horn 22 holding a shirred or folded casing 28 is then brought into stuffing position by a manual indexing device, not shown. As the casing carrying horn comes into position, the folds of the casing push the roller arm of limit switch 26 and close contacts LS-1A while opening contacts LS-1B. Time delay sausage stuffer coil 2-TDR in line 602 becomes energized and then contacts 2-TDR are closed to start the stuffer for the flow of sausage dough through the horn 22. Also, coil 1-TDR in line 603 is energized to begin a time delay period sufficient for a fully filled casing portion to get between belts 42 and 44 before contacts 1-TDR in line 605 are closed to actuate solenoid B and open valve 140. Otherwise, the shoe 90 would not sense the presence of a casing and would move instantly to the lowest speed position for belts 42 and 44 and cause a certain amount of hunting action as the leading end of the casing begins to move between the belts.

As the sausage dough flows out of the horn, it fills the leading end of the casing and pushes the filled casing portion between belts 42 and 44. When the folds of the casing are pulled out and flattened near the trailing end of the casing, and between the roller arm and the stuffer horn, the arm moves in toward the flattened surface and actuates limit switch 26 to open contacts LS-1A and close contacts LS-1B. The opening of contacts LS-1A de-energizes solenoid B to close valve 140 and diaphragm 150 is held in its last operating position before the trailing end of the casing runs off the horn. Also coil 2-TDR is de-energized to start a time delay period before opening contacts 2-TDR. This delay is adjustable to compensate for variations of stuffer stopping time which result from differences in sausage dough consistency, and also for variations in the stiffness and folded shirred tightness between different makes of casings. The delay is adjustable in order to obtain a predetermined length of unfilled casing at the trailing end portion which can be tied to a similar previously filled casing for feeding into a sausage linking machine. In practice, the roller arm of limit switch 26 is located so that approximately one inch of folded casing is on the horn behind the switch roller at the time the switch is actuated to open contacts LS-1A.

At the same time, the closing of contacts LS-1B energizes the operating coil 3-TDR in line 608, which coil is a timing relay to delay the operation of the indexing clutch 23, so that time is given for the stuffer to come to a stop before the next horn is indexed into position.

At the end of the time delay period controlled by coil 3-TDR, contacts 3-TDR in line 609 close and current flows through normally closed contacts 4-TDR in line 610 to actuate the indexing solenoid for clutch 23. Another horn 22, with an unstuffed casing thereon, is thus indexed into stuffing position. Delay coil 4-TDR in line 609a opens contacts 4-TDR in line 610 and de-energizes solenoid A to prevent double indexing.

For manual operation, switch SS-1 is set to manual control so that coil 3-TDR is not energized and contacts 3-TDR remain open, no current reaching solenoid A. Otherwise, the circuit operates the same as described for automatic operation, except that manual indexing is required.

Knee switch SW-1 in line 602 is provided to stop the flow of dough from the stuffer through horn 22 in the event that the casings burst while being filled.

Having now described the means by which the objects of the invention are obtained, I claim:

1. A casing diameter sensing device for a stuffed sausage casing sizer comprising belt conveying means for receiving and transporting a length of stuffed sausage casing from a stuffing horn, a rock shaft, a shoe connected to said rock shaft and slidable upon said belt means for causing a change in the position of said belt means to turn said rock shaft, and pointer means joined to said rock shaft for indicating a changed belt position to show a change in the diameter of the stuffed sausage casing as it is transported by said belt means.

2. A device as in claim 1, said belt means comprising an upper and a lower endless belt having parallel reaches, link means joining said belts into a parallelogram frame, and rod means for moving said link means for changing the distance between the parallel reaches of the upper and the lower belts.

3. A device as in claim 2, further comprising a variable speed pulley joined to the upper and the lower belts, and a motor connected to said pulley.

4. A device as in claim 3, further comprising means for shifting the position of said motor relative to said variable speed pulley to change the speed of said pulley.

5. A device as in claim 4, further comprising automatic control means coupling said rock shaft and said variable speed pulley for changing the speed of the upper and the lower belt.

6. A device as in claim 5, said automatic control means including a roller bearing on the pulley belt of said variable speed pulley, and means responsive to movement of said rock shaft for changing the bearing pressure of said roller on said pulley to change the belt speed.

7. A device as in claim 6, further comprising pointer means coupled to said roller for indicating the position of said roller with respect to the operating range of the sizer.

8. A stuffed sausage casing sizer as in claim 1, further comprising electrical limit switch means engageable with a folded sausage casing on the stuffing horn and being actuatable when the casing is pulled from between the limit switch means and said horn for stopping the pumping of sausage dough into said casing.

9. A casing diameter sensing device for a stuffed sausage casing sizer comprising power driven moving conveying means for receiving and transporting a length of stuffed sausage casing from a stuffing horn, means for holding the length of stuffed sausage casing in contact with said conveying means, sensing means actuated by said conveying means for detecting a change in the diameter of the stuffed sausage casing as it is transported by said conveying means, and indicator means connected to said sensing means for showing a change in the diameter of the stuffed sausage casing as it is transported by said conveying means.

References Cited in the file of this patent

UNITED STATES PATENTS

| | | |
|---|---|---|
| 557,032 | Seideman | Mar. 24, 1896 |
| 1,043,241 | Louden | Nov. 5, 1912 |
| 2,142,505 | Gammeter | Jan. 3, 1939 |
| 2,754,538 | Maier | July 17, 1956 |
| 2,754,699 | Pulman | July 17, 1956 |
| 2,863,167 | Nordin | Dec. 9, 1958 |
| 2,871,727 | Malick | Feb. 3, 1959 |
| 2,929,100 | Demarest et al. | Mar. 22, 1960 |
| 2,999,270 | Knapp | Sept. 12, 1961 |

FOREIGN PATENTS

| | | |
|---|---|---|
| 522,816 | Canada | Mar. 20, 1956 |